July 13, 1965  R. A. ROBERT ETAL  3,194,119
CLOSING DEVICES FOR ROCKET BOMB NOZZLE
Filed May 6, 1963  2 Sheets-Sheet 1

July 13, 1965  R. A. ROBERT ETAL  3,194,119
CLOSING DEVICES FOR ROCKET BOMB NOZZLE
Filed May 6, 1963  2 Sheets-Sheet 2
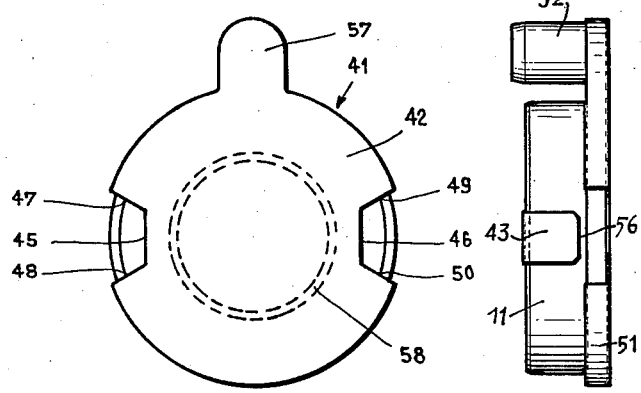
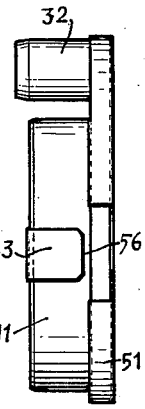
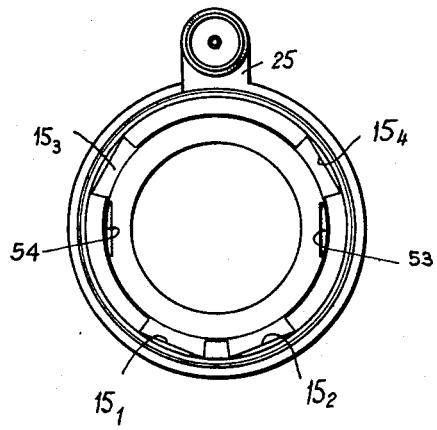
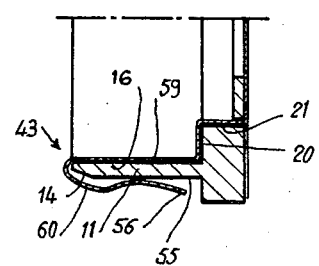
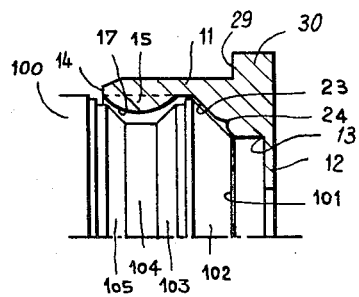

United States Patent Office 3,194,119
Patented July 13, 1965

3,194,119
CLOSING DEVICES FOR ROCKET BOMB NOZZLE
Roger Aimé Robert, Le Vesinet, France, and Pierre Paul Matge, deceased, late of Cachan, France, by Louise Rosemonde Paulette Matge, Helene Suzanne Madeleine Matge, and Jean-Pierre Louis Matge, heirs, all of Cachan, France, assignors to Louise Rosemonde Paulette Jacquot, heir of Pierre Paul Matge, deceased
Filed May 6, 1963, Ser. No. 279,677
Claims priority, application France, July 17, 1962, 904,218
5 Claims. (Cl. 89—1.7)

This invention relates to the maintenance and ignition of a guided missile or rocket, in particular but not exclusively of a rocket carried by an airplane and more especially a rocket housed in a tube adapted to guide it on the first part of its trajectory.

It is one object of the invention to provide a device which ensures the immobilization of a rocket in a tube with respect to longitudinal acceleration, that is to say having a component directed along the axis of the tube.

It is a further object of the invention to provide a device which comprises simultaneously means forming part of the electric circuit interposed between an electric supply and the igniting device of a rocket.

It is also an object of the invention to provide a device which protects the rocket from disturbing electrical influences arising from static electricity and from stray radiation or radio-electric energy, which frequently manifest themselves with exceptional intensity in the part of the space in which the rocket is housed.

It is therefore an object of the invention to provide a device which avoids accidents which sometimes take place with devastating results because of the ill-timed setting off of a rocket.

It is also an object of the invention to provide such a device which is easy and economical to manufacture, and which may be easily positioned and conforms better than the devices known hitherto with the various conditions desired in practice.

The invention will be better understood by the following description given by way of example. This description is given with reference to the accompanying drawings, in which:

FIG. 3 is a partial view in longitudinal section of the device co-operating with the nozzle of a rocket;

FIG. 4 is a view from behind of the cup device;

FIG. 5 is a view in side elevation of the cup device;

FIG. 6 is a view from the front of the dish body of the cup device without its metal lining;

FIG. 7 is a view in partial longitudinal section of the cup device taken through a tab of a cover plate of the cup device.

Figure 2:
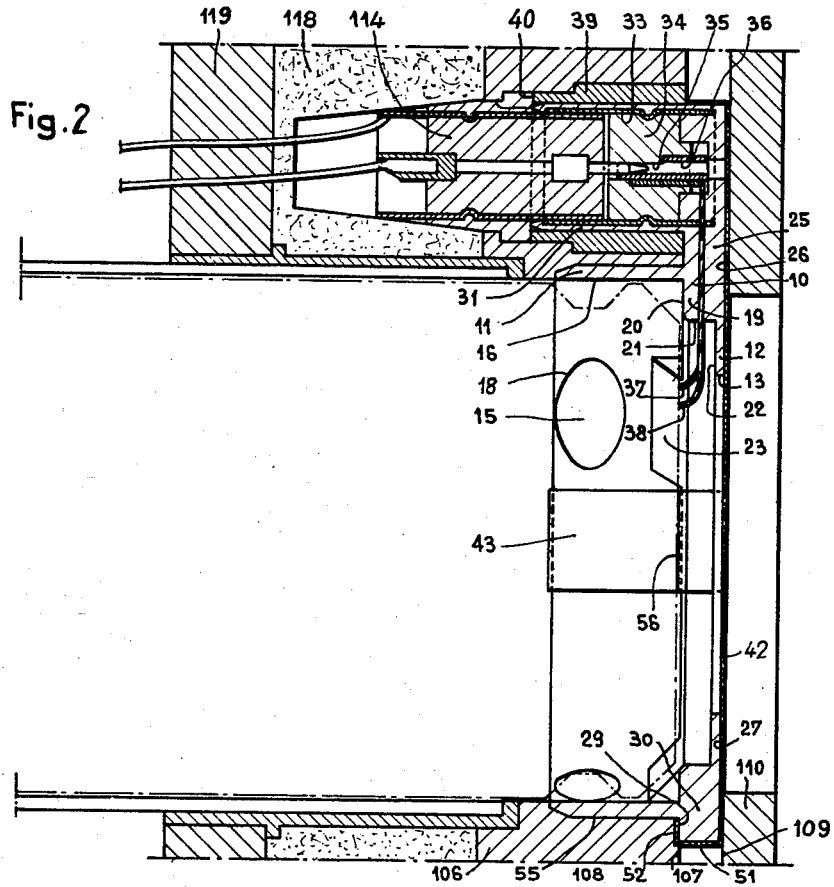
FIG. 2 is a view in longitudinal section on a larger scale.
Figure 1:
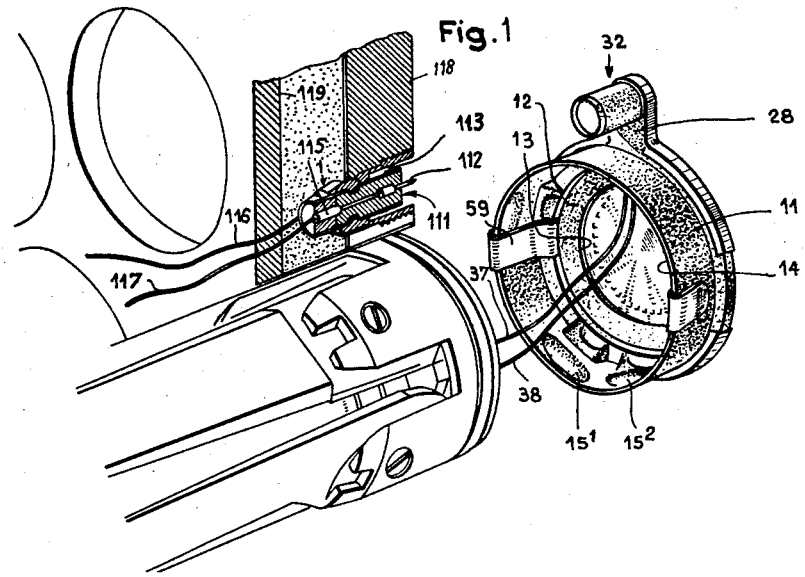
FIG. 1 is a perspective view the cap device being shown at a distance from the nozzle of the rocket with which it co-operates and certain parts of the supporting structure of the guide tubes being broken away.

The device according to the invention is in the general form of a cap or dish. It comprises a body 10 (FIGURES 1 to 3) of plastic material, obtained by moulding, and in the general form of a dish with a lateral surface or rim 11 which is cylindrical and relatively thin so as to be able to be deformed elastically, for a purpose which will become apparent hereunder, and an annular bottom 12 limited by a circular contour 13 defining an orifice or opening. The rim 11 has towards its outer edge 14 on its internal surface 16 a plurality of bosses 15 which have in longitudinal section a concave contour 17. The said bosses are joined with the cylindrical internal surface 16 along a contour of substantially elliptical shape shown at 18. The lateral wall 11 is connected with the bottom proper 12 by means of a step 19, the internal surface of the device therefore comprising in addition to the cylindrical surface 16, a shoulder 20, a cylindrical surface 21 of low height and a plane internal surface 22 of the bottom 12. In alignment with each boss 15, the cylindrical internal surface 16 is connected with the cylindrical surface 21 by an oblique face 23 having in the immediate vicinity of its attachment to the surface 21 a slight depression 24. The circumferential extent of the oblique face 23 is substantially the same as that of the boss 15. The said bosses as well as the oblique faces adjacent thereto are distributed angularly around the axis of the dish; in the embodiment shown, two such pairs of bosses and oblique faces are shown adjacent one another as can be seen at $15^1$ and $15^2$ for the bosses in FIGURE 6 and two other pairs comprising the bosses $15^3$ and $15^4$, the boss $15^3$ being angularly equi-distant from the bosses $15^1$ and $15^4$, and the boss $15^4$ being angularly equidistant from the bosses $15^2$ and $15^3$.

The body 10 is extended in a zone situated, in the embodiment shown, between the pairs comprising the bosses $15^3$ and $15^4$ by a radial flap 25, the rear face 26 of which extends in the plane of the rear face 27 of the bottom 12 and the front face 28 of which extends in the plane of the front face 29 of the rib 30 bordering the bottom 12 of the dish; the flap 25 is integral with the body 31 by a coaxial connection 32, the outer conductor or sheath 33 of which surrounds a washer 34 of insulating material, which is provided with an axial passage 35 for the central conductor 36, here designed in the form of a female member. The cylindrical body 31 projects with respect to the washer 34.

Two conductors 37 and 38 are countersunk in the flap 25 and are connected to the peripheral sheath 33 and the axial conductor 36 respectively, the said conductors being adapted to be connected to the igniting device of a rocket bomb.

On the rear surface 27 of the bottom 12 is secured a metal cover plate 41 preferably of copper or a copper alloy having a bottom 42 of substantially circular form with cut out portions defining two tabs 43 and 44 connected to the said bottom along lines of folding 45 and 46. The tabs 43, 44 constitute metallic sheet means which cover a portion of the inner and outer surface of the body as will be seen hereinafter. The cut out portions in the plate 41 define substantially radiating edges 47, 48, 49, 50 and the bottom 42 is continued by a rim portion constituted by a cylindrical surface 51 following the contour of the rib 30 with a return portion 52 in contact with the outer face 29 and ensuring assembly of the cover plate 41 with the bottom 12. The tabs 43 and 44 pass through the bottom 12 through ports 53 and 54 (FIGURE 6) provided in the bottom 12 to the connection with the cylindrical surface 21; they are applied against the said surface; the shoulder 20 (FIGURE 7) and the cylindrical surface 16 are turned back against the front edge 14 and folded onto the external surface 55, the end 56 of one tab, for example the tab 43, being opposite the return 52; a particular curve is given to the part of the tab turned onto the external face 55; the plate has an appendix 57 corresponding to the flap 25, the cylindrical surface 51 being continued along the said appendix. The plate 41 comprises a plurality of stamped indentations arranged around a circle in circular stamping 58 which has a diameter slightly less than that of the orifice defined by the contour 13.

Operation of the device is as follows:

The device or cap which has been described is placed on the nozzle 100 which forms the rear end of a rocket bomb and comprises in a known manner, starting from the orifice 101, a first frusto-conical surface 102, followed by a second frusto-conical surface 103 having an opposite inclination from that of the frusto-conical surface 102, the frusto-conical surface 103 being followed by a cylindrical surface 104 limiting the narrow section of the nozzle, the cylindrical part 104 being followed by a frusto-conical surface 105 having an opposite inclination from that of the portion 103. The positioning of the device on the rear end of the nozzle, in spite of the obstacle constituted by the large diameter connection between the frusto-conical parts 102 and 103, is rendered possible by the elasticity of the lateral wall 11 and, having passed the large diameter portion, the bosses 15 become housed in the groove formed by the frusto-conical portions 103 and 105 and the cylindrical portion 104, the profile 17 of each boss 15 corresponding substantially to the said groove.

A rocket bomb thus provided with the device according to the invention is then introduced into its guiding tube and when the rocket bomb is positioned, the external surface 55 of the lateral wall 11 of the device is in contact with and by a sleeve 106, which prevents any disengagement of the bosses 15 with respect to the groove in the nozzle in which they are housed. The frusto-conical surface 102 comes to bear against the inclined face 23. The device according to the invention is thus connected with the rocket bomb and when the bomb is in place, the said device bears by the front face 29 of its rib 30 against the rear face 107 of a structural element 108 forming part of the launching device and by its rear face 27 against the front face 109 of a structural element 110 forming part of the launching device. Finally, therefore, the device according to the invention ensures the positive immobilization of a rocket bomb with respect to longitudinal accelerations in either direction which may be exerted thereon.

During the positioning, the coaxial connecting element 32 comprised by the device according to the invention cooperates with the twin coaxial connecting element 111 provided on the launching apparatus and comprising a male member 112 co-operating with the female member 36 and a cylindrical sheath 113 co-operating with the cylindrical sheath 33, an insulating block 114 being interposed between the coaxial conductor 115 and the sheath 113. To the latter is connected an insulated conducting wire 116 and to the member 115 is connected an insulated conducting wire 117 The switch is fixed in the frame of the rocket launcher by a metal nut 39, the edge of which is upturned at 40.

In the embodiment shown, the coaxial connecting element 111 is countersunk in a wall 118 of electrically insulating foam material flanked by the structural element 106 and a front structural element 119.

The tabs 43 and 44 are in contact by their inner part 59 with respect to the rim 11 with the nozzle of the rocket bomb, and by their part 60 outside the rim 11 with the guiding tube, thus permanently ensuring equality of potential between the body of the rocket bomb and its guiding tube.

During the positioning of the device at the rear of the rocket bomb, both the axial conductor 35 and the sheath 33 of the coaxial connecting element remain insulated with respect to the hand of the operator thus rendering ineffective any static electricity which may be carried by the operator.

The plate 41 constitutes an electric screen and intercepts Hertzian beams from radar equipment and high frequency transmitters.

Setting off is ensured by the supply device provided for this purpose on the launching apparatus by the application of a difference in electrical potential between the conducting wires 116 and 117. This difference of potential is transmitted by the coaxial connection constituted by the assembly of elements 114 and 32 and by the conductors 37 and 38 terminating at the igniting device of the rocket bomb.

The gas jet emitted by the nozzle breaks the bottom of the metal plate, the circle of indentation 58 constituting a line of least resistance, localizing the break along the said line, so that it is the central disc of the plate limited by the said line which is expelled. The device remains otherwise in place. The thrust force exerted by the ejection of the gasses causes the rocket bomb to move forward and as it does so it flattens the bosses 15 to an extent sufficient to allow passage of the frusto-conical portion 103.

What we claim is:

1. For placing over the rear opening of the nozzle of an electrically actuated rocket bomb adapted for being contained in a guide tube; a device for closing said opening comprising a one-piece dish of electrically insulating material including a generally hollow cylindrical body with a generally plane annular bottom having an inner and an outer surface, said bottom defining a central opening for the cylindrical body, a radially projecting rib on the body integral therewith and constituting a stop for limiting the depth of penetration of the dish in the guide tube while immobilizing the body and rocket bomb in the tube with respect to forward movement prior to firing, a substantially continuous metallic cover on the outer surface of the bottom of the cup, said metallic cover including a rim portion engageably covering the rib to secure the cover and the dish together, said cylindrical body having an inner and an outer surface, metallic sheet means in electrical contact with said metallic cover and extending through said bottom to contact and cover a portion of the inner surface of said body and a portion of the outer surface of said body such that the sheet means covering the portion of the outer surface of the body can be in contact with the guide tube when the device is inserted therein, and the conducting means incorporated in said body for conducting electric current adapted to fire the rocket bomb and being protected from stray radiation by said metallic cover.

2. A device according to claim 1, wherein the metallic sheet means is integral with said cover and passes through the annular bottom of said body by way of openings provided in the latter.

3. A device according to claim 2, wherein the sheet means is constituted by tabs mounted astride the body of the dish.

4. A device according to claim 1, wherein the metallic cover comprises a zone of lesser resistance opposite the central opening of said body.

5. A device according to claim 1, wherein said conducting means comprises an integral electrical connection plug on the body of the dish, said plug having an open rear surface, said metallic cover comprising an extension covering the rear surface of said plug.

References Cited by the Examiner
UNITED STATES PATENTS

| | | | |
|---|---|---|---|
| 2,645,999 | 7/53 | Bogard | 89—1.7 XR |
| 2,706,431 | 4/55 | Grill | 89—1.7 |
| 2,803,168 | 8/57 | Robert et al. | 89—1.7 |
| 2,826,120 | 3/58 | Lang et al. | 89—1.7 |
| 3,031,932 | 5/62 | Fite | 89—1.7 |
| 3,039,363 | 6/62 | Grillo et al. | 89—1.7 |
| 3,088,373 | 5/63 | Robert et al. | 89—1.7 |

BENJAMIN A. BORCHELT, *Primary Examiner.*

SAMUEL W. ENGLE, *Examiner.*